(12) United States Patent
Kim

(10) Patent No.: US 10,341,481 B2
(45) Date of Patent: Jul. 2, 2019

(54) BLUETOOTH APPARATUS OF VEHICLE AND METHOD AND APPARATUS FOR MANAGING COMMUNICATION CONNECTION OF VEHICLE

(71) Applicants: HYUNDAI MOTOR COMPANY, Seoul (KR); KIA MOTORS CORPORATION, Seoul (KR)

(72) Inventor: Jeong Hun Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/809,684

(22) Filed: Nov. 10, 2017

(65) Prior Publication Data
US 2018/0352066 A1 Dec. 6, 2018

(30) Foreign Application Priority Data
Jun. 2, 2017 (KR) ........................ 10-2017-0069030

(51) Int. Cl.
| H04M 1/725 | (2006.01) |
| H04W 76/14 | (2018.01) |
| B60N 2/00 | (2006.01) |
| H04M 1/60 | (2006.01) |
| H04W 4/02 | (2018.01) |

(52) U.S. Cl.
CPC .......... *H04M 1/7253* (2013.01); *B60N 2/002* (2013.01); *H04M 1/72569* (2013.01); *H04W 4/023* (2013.01); *H04W 76/14* (2018.02); *H04M 1/6075* (2013.01); *H04M 2250/02* (2013.01)

(58) Field of Classification Search
CPC ............ H04W 4/40; H04W 4/48; H04W 4/80
See application file for complete search history.

(56) References Cited

U.S. PATENT DOCUMENTS

| 2010/0216401 | A1* | 8/2010 | Kitahara | H04M 1/6091 455/41.2 |
| 2012/0071097 | A1* | 3/2012 | Matsushita | H04M 1/6091 455/41.2 |
| 2013/0005260 | A1 | 1/2013 | Hosono et al. | |
| 2013/0183957 | A1* | 7/2013 | Iwasaki | H04M 1/6091 455/420 |
| 2014/0163774 | A1* | 6/2014 | Demeniuk | G08C 17/02 701/2 |
| 2015/0208194 | A1* | 7/2015 | Ito | H04W 4/046 455/41.2 |
| 2017/0019525 | A1* | 1/2017 | Hannon | H04M 1/72577 |
| 2017/0078835 | A1* | 3/2017 | Ochi | H04W 60/04 |

FOREIGN PATENT DOCUMENTS

| KR | 10-0667058 B1 | 1/2007 |
| KR | 10-1587063 B1 | 1/2016 |

* cited by examiner

*Primary Examiner* — Wen W Huang
(74) *Attorney, Agent, or Firm* — Morgan Lewis & Bockius LLP

(57) ABSTRACT

A Bluetooth apparatus for a vehicle controls a connection between a plurality of Bluetooth profiles and a terminal of a user based on whether a driver's seat is occupied by the user or based on whether the driver's seat is occupied by the user and whether the terminal of the user is located in the vehicle.

17 Claims, 6 Drawing Sheets

BLUETOOTH APPARATUS OF VEHICLE AND METHOD AND APPARATUS FOR MANAGING COMMUNICATION CONNECTION OF VEHICLE

CROSS-REFERENCE TO RELATED APPLICATION

This application is based on and claims the benefit of priority to Korean Patent Application No. 10-2017-0069030, filed on Jun. 2, 2017, in the Korean Intellectual Property Office, the disclosure of which is incorporated herein in its entirety by reference.

TECHNICAL FIELD

The present disclosure relates to a Bluetooth apparatus of a vehicle, a method for managing a communication connection of the vehicle, and an apparatus for managing the communication connection of the vehicle.

BACKGROUND

In recent, the vehicle ownership is becoming more common along with the development of the automobile industry and the good living conditions. The users connect their smartphones to the vehicle through the Bluetooth pairing in the vehicle to enjoy media files, such as MP3, audio, video, or the like, in the vehicle and to make a hands-free call as well.

The smartphone is connected to the vehicle through various Bluetooth profiles in the Bluetooth pairing process. However, when the user is not located in the driver's seat, as an example, it is better not to connect a hands-free profile to the smartphone since it is difficult for the user to operate the button for hands-free call. Since a technology, which manages a connection between the smartphone and each Bluetooth profile depending on a situation of the user and the passenger and/or the position of a terminal like the smartphone, has not yet been developed, a user convenience is not sufficiently guaranteed.

SUMMARY

The present disclosure has been made to solve the above-mentioned problems occurring in the prior art while advantages achieved by the prior art are maintained intact.

An aspect of the present disclosure provides a Bluetooth apparatus capable of improving a user's convenience, a method for managing a communication connection of the vehicle, and an apparatus for managing the communication connection of the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a Bluetooth apparatus for a vehicle controls a connection between a plurality of Bluetooth profiles and a terminal of a user based on whether a driver's seat is occupied by the user or based on whether the driver's seat is occupied by the user and whether the terminal of the user is located in the vehicle.

The Bluetooth profiles include a first Bluetooth profile and a second Bluetooth profile, the first Bluetooth profile is a hands-free profile (HFP), and the second Bluetooth profile is an advanced audio distribution profile ($A^2DP$) or an audio/video remote control profile (AVRCP).

The first Bluetooth profile and the second Bluetooth profile are connected to the terminal in the case that the driver's seat is occupied.

In the case that the driver's seat is not occupied and the terminal is located in the vehicle, the first Bluetooth profile is not connected to the terminal, and the second Bluetooth profile is connected to the terminal.

In the case that the driver's seat is not occupied and the terminal is not located in the vehicle, the first Bluetooth profile and the second Bluetooth profile are not connected to the terminal.

According to another aspect of the present disclosure, an apparatus for managing a communication connection of a vehicle includes: a driver seat detection sensor that detects whether a driver's seat is occupied; a terminal detection sensor that detects whether a terminal of a user is located in a vehicle; and a Bluetooth connection management controller that controls a connection between a plurality of Bluetooth profiles and the terminal based on whether the driver's seat is occupied by the user or based on whether the driver's seat is occupied by the user and whether the terminal of the user is located in the vehicle.

The Bluetooth profiles include a first Bluetooth profile and a second Bluetooth profile, the first Bluetooth profile is an HFP, and the second Bluetooth profile is an $A^2DP$ or an AVRCP.

When the driver's seat is occupied, the Bluetooth connection management controller connects the first Bluetooth profile and the second Bluetooth profile to the terminal.

When the driver's seat is not occupied and the terminal is located in the vehicle, the Bluetooth connection management controller connects the second Bluetooth profile to the terminal without connecting the first Bluetooth profile to the terminal.

When the driver's seat is not occupied and the terminal is not located in the vehicle, the Bluetooth connection management controller disconnects the first Bluetooth profile and the second Bluetooth profile to the terminal.

The driver seat detection sensor includes a driver seat occupancy sensor or a seat-belt sensor.

The terminal detection sensor determines that the terminal is located in the vehicle in a case that the terminal detection sensor periodically transmits an ultrasonic wave to the terminal and receives a response message from the terminal.

According to another aspect of the present disclosure, a method for managing a communication connection of a vehicle includes steps of: detecting whether a driver's seat is occupied; detecting whether a terminal of a user is located in the vehicle; and controlling a connection between a plurality of Bluetooth profiles and the terminal based on whether the driver's seat is occupied by the user or based on whether the driver's seat is occupied by the user and whether the terminal of the user is located in the vehicle.

The Bluetooth profiles include a first Bluetooth profile and a second Bluetooth profile, the first Bluetooth profile is an HFP, and the second Bluetooth profile is an $A^2DP$ or an AVRCP.

The step of controlling includes connecting the first Bluetooth profile and the second Bluetooth profile to the terminal in the case that the driver's seat is occupied.

The step of controlling includes connecting the second Bluetooth profile to the terminal without connecting the first Bluetooth profile to the terminal in the case that the driver's seat is not occupied and the terminal is located in the vehicle.

The step of controlling cle includes not connecting the first Bluetooth profile and the second Bluetooth profile to the terminal in the case that the driver's seat is not occupied and the terminal is not located in the vehicle.

According to the above, the Bluetooth apparatus of the vehicle, the communication connection management apparatus of the vehicle, and the communication connection management method of the vehicle may improve a user's convenience.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
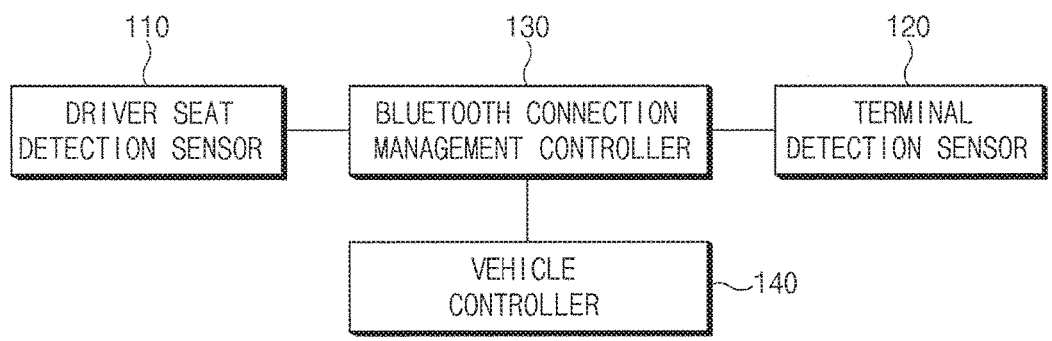
FIG. 1 is a block diagram illustrating an apparatus for managing a communication connection of a vehicle according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In the following embodiments, it is assumed that a vehicle is turned on and a terminal of a user has a Bluetooth connection history with a Bluetooth apparatus of the vehicle. Accordingly, it is assumed that a Bluetooth pairing starts in a case that the Bluetooth apparatus of the vehicle senses the terminal of the user.

FIG. 1 is a block diagram illustrating an apparatus for managing a communication connection of a vehicle according to an exemplary embodiment of the present disclosure.

Referring to FIG. 1, a communication connection management apparatus 100 for the vehicle may include a driver seat detection sensor 110, a terminal detection sensor 120, a Bluetooth connection management controller 130, and a vehicle controller 140.

The driver seat detection sensor 110 may detect whether a driver's seat is occupied by a user. For instance, the driver seat detection sensor 110 may be a seat occupancy sensor or a seat-belt sensor, and the seat occupancy sensor may include a piezoelectric sensor installed in the driver's seat. The driver seat detection sensor 110 may transmit a result of the detection whether the driver's seat is occupied by the user to the Bluetooth connection management controller 130.

The Bluetooth connection management controller 130 may be connected to or integrated with the vehicle controller 140 which includes an electronic control unit (ECU) configured to control various types of devices mounted within the vehicle.

The terminal detection sensor 120 may detect whether a terminal of the user is located in the vehicle. For instance, the terminal detection sensor 120 may detect whether the terminal of the user is located in the vehicle in a case that a door of the vehicle is closed after being opened. According to an embodiment, the terminal detection sensor 120 may detect whether the terminal of the user is located in the vehicle based on an ultrasonic wave sound tag technology. As an example, the terminal detection sensor 120 may determine that the terminal is located in the vehicle by periodically transmitting an ultrasonic wave to the terminal of the user and receiving a response message from the terminal. In the present embodiment, the response message may be received from the terminal through a serial port protocol (SPP) Bluetooth protocol. The terminal detection sensor 120 may transmit the terminal detection result to the Bluetooth connection management controller 130.

The Bluetooth connection management controller 130 may manage a Bluetooth pairing operation with the terminal of the user. The Bluetooth connection management controller 130 may detect the terminal of the user when being woken up in response to a control by the vehicle controller 140 and start the Bluetooth pairing operation with the detected terminal of the user.

The Bluetooth connection management controller 130 may manage a connection between a Bluetooth profile and the terminal of the user. The Bluetooth connection management controller 130 may control the connection between a plurality of Bluetooth profiles and the terminal of the user based on whether the driver's seat is occupied by the user or based on whether the driver's seat is occupied by the user and the terminal of the user is located in the vehicle. For instance, the Bluetooth profiles may include a first Bluetooth profile and a second Bluetooth profile, the first Bluetooth profile may be a hands-free profile (HFP), and the second Bluetooth profile may be an advanced audio distribution profile ($A^2DP$) or an AVRCP.

The Bluetooth connection management controller 130 may connect the HFP and $A^2DP$/AVRCP (to the terminal of the user in a case that the driver's seat is occupied. Accordingly, the user may make hands-free calls by operating a call button located at a steering wheel or a center fascia and enjoy media contents (e.g., music) reproduced by the terminal in the vehicle (e.g., through a speaker of the vehicle).

The Bluetooth connection management controller 130 may control the connection between the Bluetooth profiles and the terminal by further taking into account whether the terminal of the user is located in the vehicle in a case that the driver's seat is not occupied (i.e., the user is seated on another seat and not seated on the driver's seat). For instance, in the case that the driver's seat is not occupied and the terminal of the user is located in the vehicle, the Bluetooth connection management controller 130 may connect the $A^2DP/AVRCP$ to the terminal without connecting the HFP to the terminal. Accordingly, the user may make the calls from the seat in which he/she is located using the terminal (that is, since it is difficult for the user to operate the call button located at the steering wheel or the center fascia in the case that the user is seated on another seat and not seated on the driver's seat), and the user may enjoy media contents (e.g., music) reproduced by the terminal in the vehicle (e.g., through the speaker of the vehicle).

The Bluetooth connection management controller 130 may not connect the HFP and the $A^2DP/AVRCP$ to the terminal of the user in the case that the driver's seat is not occupied and the terminal is not located in the vehicle. This is to allow the user to make the call by directly using the terminal since it is very likely that the user is located outside the vehicle.

The vehicle controller 140 may control overall operations of the driver seat detection sensor 110, the terminal detection sensor 120, and the Bluetooth connection management controller 130. The vehicle controller 140 may supply a power to the driver seat detection sensor 110, the terminal detection sensor 120, and the Bluetooth connection management controller 130 in the case that the vehicle is turned on.

Figure 2:
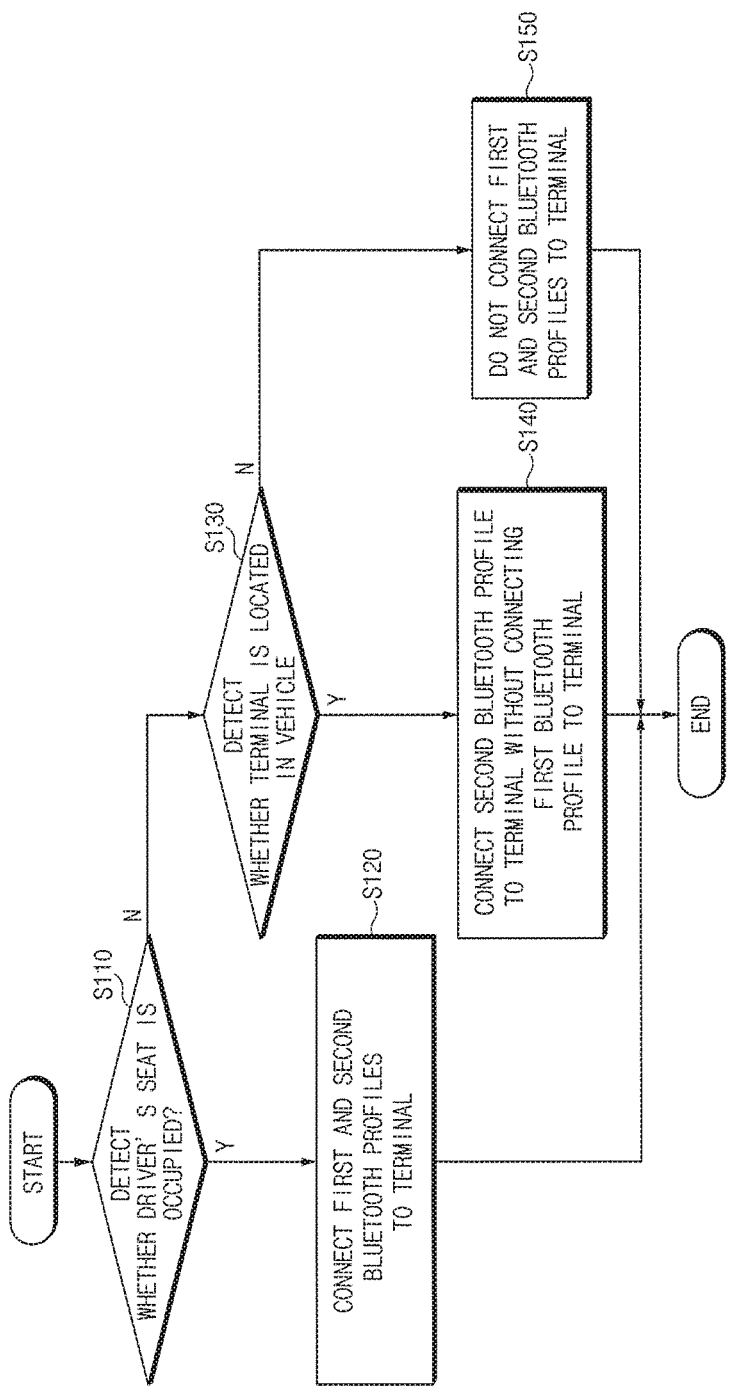
FIG. 2 is a flowchart illustrating a method for managing a communication connection of a vehicle according to an exemplary embodiment of the present disclosure.

FIG. 2 is a flowchart illustrating a method for managing a communication connection of a vehicle according to an exemplary embodiment of the present disclosure.

Referring to FIG. 2, the communication connection management method of the vehicle may include detecting whether the driver's seat is occupied (S110), connecting the first Bluetooth profile and the second Bluetooth profile to the terminal in the case that the driver's seat is occupied (S120), detecting whether the terminal is located in the vehicle in the case that the driver's seat is not occupied (S130), connecting the second Bluetooth profile to the terminal without connecting the first Bluetooth profile to the terminal in the case that the terminal is located in the vehicle (S140), and not connecting the first and second Bluetooth profiles to the terminal in the case that the terminal is not located in the vehicle (S150). For instance, the first Bluetooth profile may be the HFP, and the second Bluetooth profile may be the $A^2DP$ or AVRCP.

Hereinafter, the above-described operations S110 to S150 will be described in detail.

In operation S110, the driver seat detection sensor 110 may detect whether the driver's seat is occupied. For instance, the driver seat detection sensor 110 may be the seat occupancy sensor or the seat-belt sensor, and the seat occupancy sensor may include the piezoelectric sensor installed in the driver's seat. As a result of the determination in operation S110, in the case that the driver's seat is occupied, operation S120 may be carried out, and in the case that the driver's seat is not occupied, operation S130 may be carried out.

In operation S120, the Bluetooth connection management controller 130 may connect the HFP and the $A^2DP/AVRCP$ to the terminal of the user.

In operation S130, the terminal detection sensor 120 may detect whether the terminal of the user is located in the vehicle. For instance, the terminal detection sensor 120 may detect whether the terminal of the user is located in the vehicle in the case that the door of the vehicle is closed after being opened. The terminal detection sensor 120 may determine that the terminal is located in the vehicle by periodically transmitting the ultrasonic wave to the terminal of the user and receiving the response message from the terminal. In the present embodiment, the response message may be received from the terminal through the serial port protocol (SPP) Bluetooth protocol. As a result of the determination in operation S130, in the case that it is determined that the terminal is located in the vehicle, operation S140 may be carried out, and in the case that it is determined that the terminal is not located in the vehicle, operation S150 may be carried out.

In operation S140, the Bluetooth connection management controller 130 may connect the $A^2DP/AVRCP$ (to the terminal without connecting the HFP to the terminal.

In operation S150, the Bluetooth connection management controller 130 may not connect the HFP and the $A^2DP/AVRCP$ to the terminal.

Figure 3:
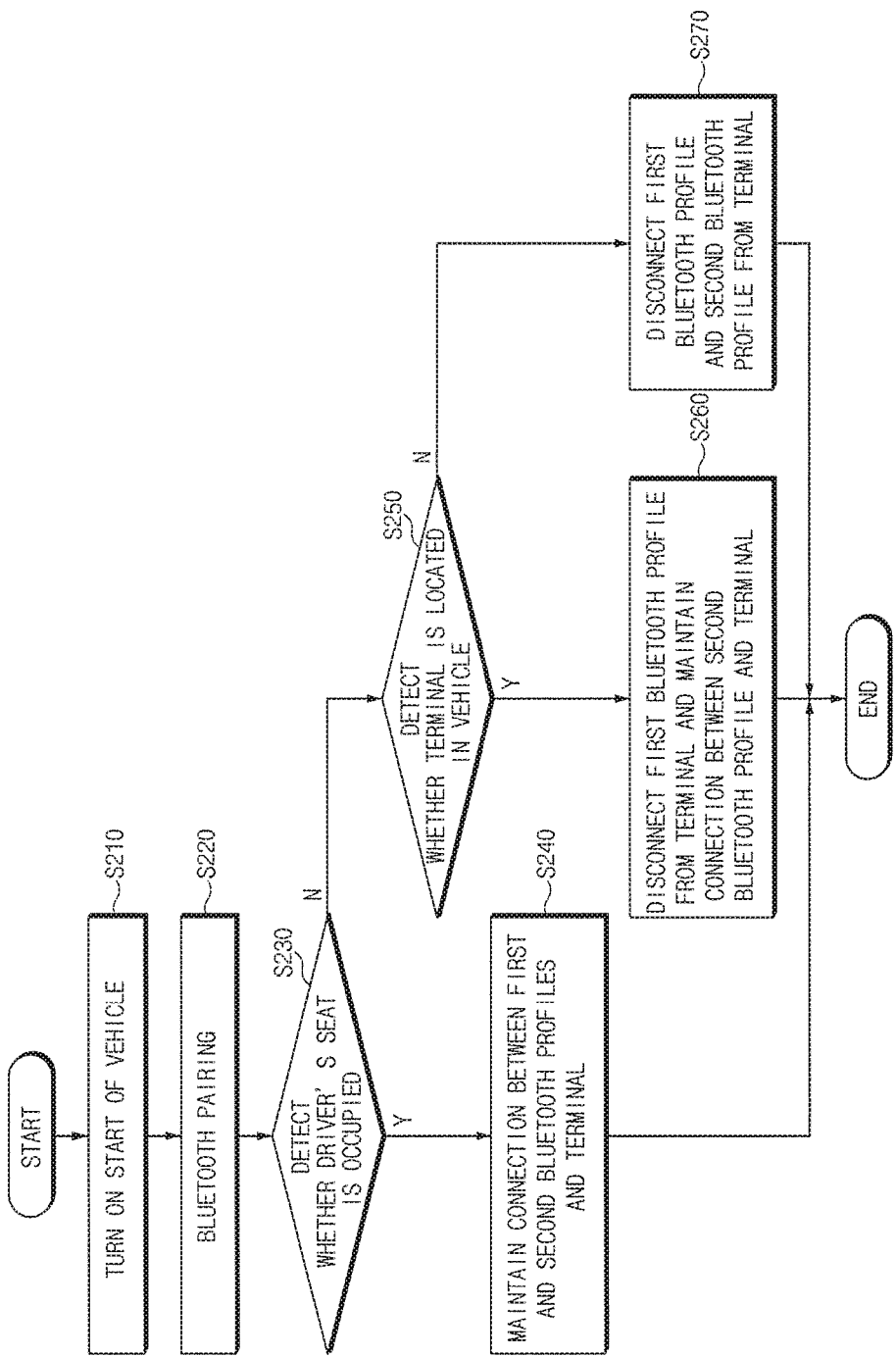
FIG. 3 is a flowchart illustrating a first application example of a method for managing a communication connection of a vehicle according to an exemplary embodiment of the present disclosure.

FIG. 3 is a flowchart illustrating a first application example of a method for managing a communication connection of a vehicle according to an exemplary embodiment of the present disclosure.

Referring to FIG. 3, the first application example of the communication connection management method of the vehicle according to the exemplary embodiment of the present disclosure may include turning on the vehicle (S210), Bluetooth-pairing the terminal of the user with the Bluetooth apparatus of the vehicle (i.e., the Bluetooth connection management controller 130) (S220), detecting whether the driver's seat is occupied (S230), maintaining the connection between the first Bluetooth profile and the second Bluetooth profile and the terminal in the case that the driver's seat is occupied (S240), detecting whether the terminal is located in the vehicle in the case that the driver's seat is not occupied (S250), disconnecting the first Bluetooth profile from the terminal and maintaining the connection between the second Bluetooth profile and the terminal in the case that the terminal is located in the vehicle (S260), and disconnecting the first Bluetooth profile and the second Bluetooth profile from the terminal in the case that the terminal is not located in the vehicle (S270). For instance, the first Bluetooth profile may be the HFP, and the second Bluetooth profile may be the $A^2DP$ or AVRCP.

Hereinafter, the above-described operations S210 to S270 will be described in detail, and the same descriptions as those described with reference to FIG. 2 will be omitted in order to avoid redundancy.

In operation S210, the vehicle may be turned on by the user's operation.

In operation S220, the Bluetooth connection management controller 130 may detect the terminal of the user and perform the Bluetooth pairing operation with the detected terminal of the user. The Bluetooth connection management controller 130 may connect the first Bluetooth profile and the second Bluetooth profile to the terminal when the Bluetooth pairing operation is completed.

In operation S230, the driver seat detection sensor 110 may detect whether the driver's seat is occupied. As a result of the determination in operation S230, in the case that the driver's seat is occupied, operation S240 may be carried out, and in the case that the driver's seat is not occupied, operation S250 may be carried out.

In operation S240, the Bluetooth connection management controller 130 may maintain the connection between the terminal of the user and the HFP and the A²DP/AVRCP.

In operation S250, the terminal detection sensor 120 may detect whether the terminal of the user is located in the vehicle. As a result of the determination in operation S250, in the case that it is determined that the terminal is located in the vehicle, operation S260 may be carried out, and in the case that it is determined that the terminal is not located in the vehicle, operation S270 may be carried out.

In operation S260, the Bluetooth connection management controller 130 may disconnect the connection between the HFP to the terminal and maintain the connection between the terminal and the A²DP/AVRCP.

In operation S270, the Bluetooth connection management controller 130 may disconnect the connection between the terminal and the HFP and between the terminal and the A²DP/AVRCP.

Figure 4:
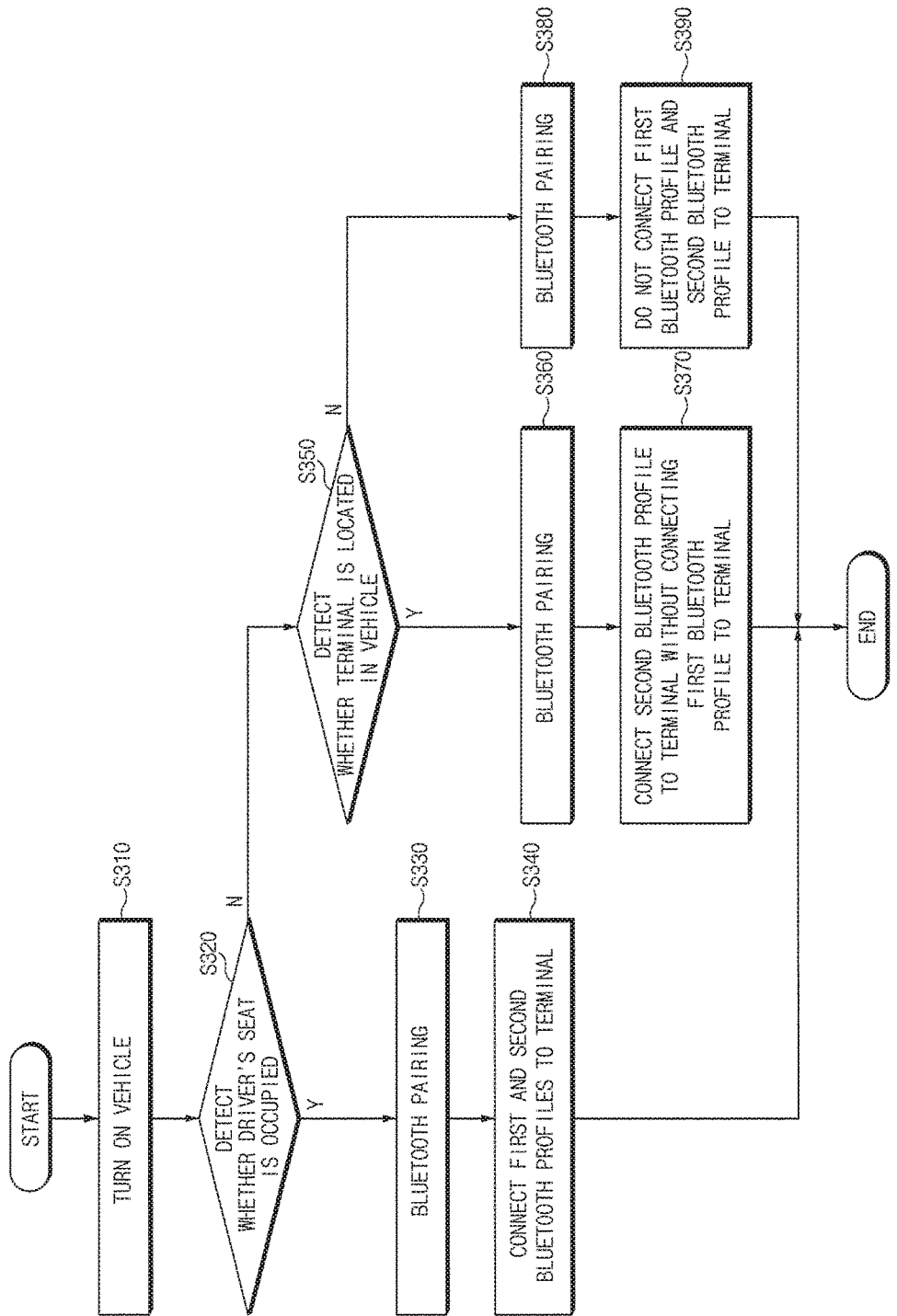
FIG. 4 is a flowchart illustrating a second application example of a method for managing a communication connection of a vehicle according to an exemplary embodiment of the present disclosure.

FIG. 4 is a flowchart illustrating a second application example of a method for managing a communication connection of a vehicle according to an exemplary embodiment of the present disclosure.

Referring to FIG. 4, the second application example of the communication connection management method of the vehicle according to the exemplary embodiment of the present disclosure may include turning on the vehicle (S310), detecting whether the driver's seat is occupied (S320), Bluetooth-pairing the terminal of the user with the Bluetooth apparatus of the vehicle (i.e., the Bluetooth connection management controller 130) (S330), connecting the first Bluetooth profile and the second Bluetooth profile to the terminal in the case that the driver's seat is occupied (S340), detecting whether the terminal is located in the vehicle in the case that the driver's seat is not occupied (S350), Bluetooth-pairing the terminal of the user with the Bluetooth apparatus of the vehicle in the case that the terminal is located in the vehicle (S360), connecting the second Bluetooth profile to the terminal without connecting the first Bluetooth profile to the terminal (S370), Bluetooth-pairing the terminal of the user with the Bluetooth apparatus of the vehicle in the case that the terminal is not located in the vehicle (S380), and not connecting the first Bluetooth profile and the second Bluetooth profile to the terminal (S390). For instance, the first Bluetooth profile may be the HFP, and the second Bluetooth profile may be the A²DP or AVRCP.

When compared to the first application example, since the driver seat detection sensor 110 and the terminal detection sensor 120 are woken up prior to the Bluetooth connection management controller 130 after the vehicle is turned on in the second application example, the connection of the Bluetooth profile may be controlled by taking into account the results of the detection whether the driver's seat is occupied and whether the terminal is located in the vehicle during the Bluetooth-pairing operation.

Hereinafter, the above-described operations S310 to S390 will be described in detail, and the same descriptions as those described with reference to FIG. 2 will be omitted in order to avoid redundancy.

In operation S310, the vehicle may be turned on by the user's operation.

In operation S320, the driver seat detection sensor 110 may detect whether the driver's seat is occupied. As a result of the determination in operation S320, in the case that it is determined that the driver's seat is occupied, operation S330 may be carried out, and in the case that it is determined that the driver's seat is not occupied, operation S350 may be carried out.

In operation S330, the Bluetooth connection management controller 130 may detect the terminal of the user and perform the Bluetooth pairing operation with the detected terminal of the user.

In operation S340, the Bluetooth connection management controller 130 may connect the HFP and the A²DP/AVRCP to the terminal of the user.

In operation S350, the terminal detection sensor 120 may detect whether the terminal of the user is located in the vehicle. As a result of the determination in operation S350, in the case that it is determined that the terminal is located in the vehicle, operation S360 may be carried out, and in the case that it is determined that the terminal is not located in the vehicle, operation S380 may be carried out.

In operation S360, the Bluetooth connection management controller 130 may detect the terminal of the user and perform the Bluetooth pairing operation with the detected terminal of the user.

In operation S370, the Bluetooth connection management controller 130 may connect the A²DP/AVRCP to the terminal of the user without connecting the HFP to the terminal.

In operation S380, the Bluetooth connection management controller 130 may detect the terminal of the user and perform the Bluetooth pairing operation with the detected terminal of the user.

In operation S390, the Bluetooth connection management controller 130 may not connect the HFP and the A²DP/AVRCP to the terminal of the user.

Figure 5:
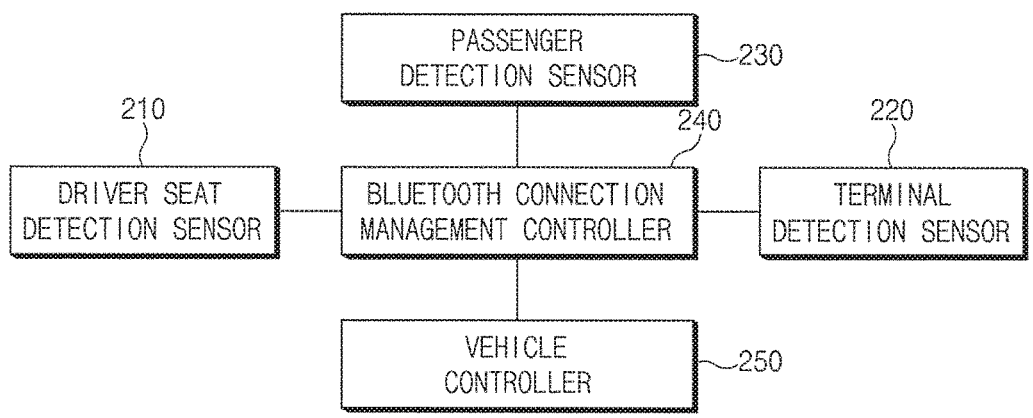
FIG. 5 is a block diagram illustrating an apparatus for managing a communication connection of a vehicle according to an exemplary embodiment of the present disclosure.

FIG. 5 is a block diagram illustrating an apparatus for managing a communication connection of a vehicle according to an exemplary embodiment of the present disclosure.

Referring to FIG. 5, the communication connection management apparatus 200 for the vehicle may include a driver seat detection sensor 210, a terminal detection sensor 220, a passenger detection sensor 230, a Bluetooth connection management controller 240, and a vehicle controller 250.

Operations of the driver seat detection sensor 210, the terminal detection sensor 220, and the vehicle controller 250 may be the same as those described with reference to FIG. 1, and thus different features of the communication connection management apparatus 200 from the communication connection management apparatus 100 will be mainly described.

The passenger detection sensor 230 may detect whether a passenger exists in the vehicle. For instance, the passenger detection sensor 230 may include various sensors, e.g., a seat occupancy sensor, a camera, a heat sensing sensor, etc. The passenger detection sensor 230 may transmit the result of the detection of the passenger in the vehicle to the Bluetooth connection management controller 240.

The Bluetooth connection management controller 240 may control a connection between a plurality of Bluetooth profiles and the terminal by further taking into account whether the passenger exists in the vehicle in the case that the driver's seat is not occupied and the terminal of the user is not located in the vehicle.

For instance, the Bluetooth connection management controller 240 may not connect the HFP and the A²DP/AVRCP to the terminal of the user in the case that the driver's seat is not occupied, the terminal of the user is not located in the vehicle, and the passenger does not exist in the vehicle.

In addition, for example, the Bluetooth connection management controller 240 may not connect the HFP to the terminal and may connect the A²DP/AVRCP to the terminal in the case that the driver's seat is not occupied, the terminal of the user is not located in the vehicle, and the passenger exists in the vehicle. In this case, since it is very likely that the user is located outside the vehicle, the user may be allowed to make the call by directly using the terminal. In addition, although the user is not seated on the driver's seat and the terminal is not located in the vehicle, the passenger in the vehicle may enjoy media contents (e.g., music) reproduced by the terminal in the vehicle (e.g., through a speaker of the vehicle).

Figure 6:
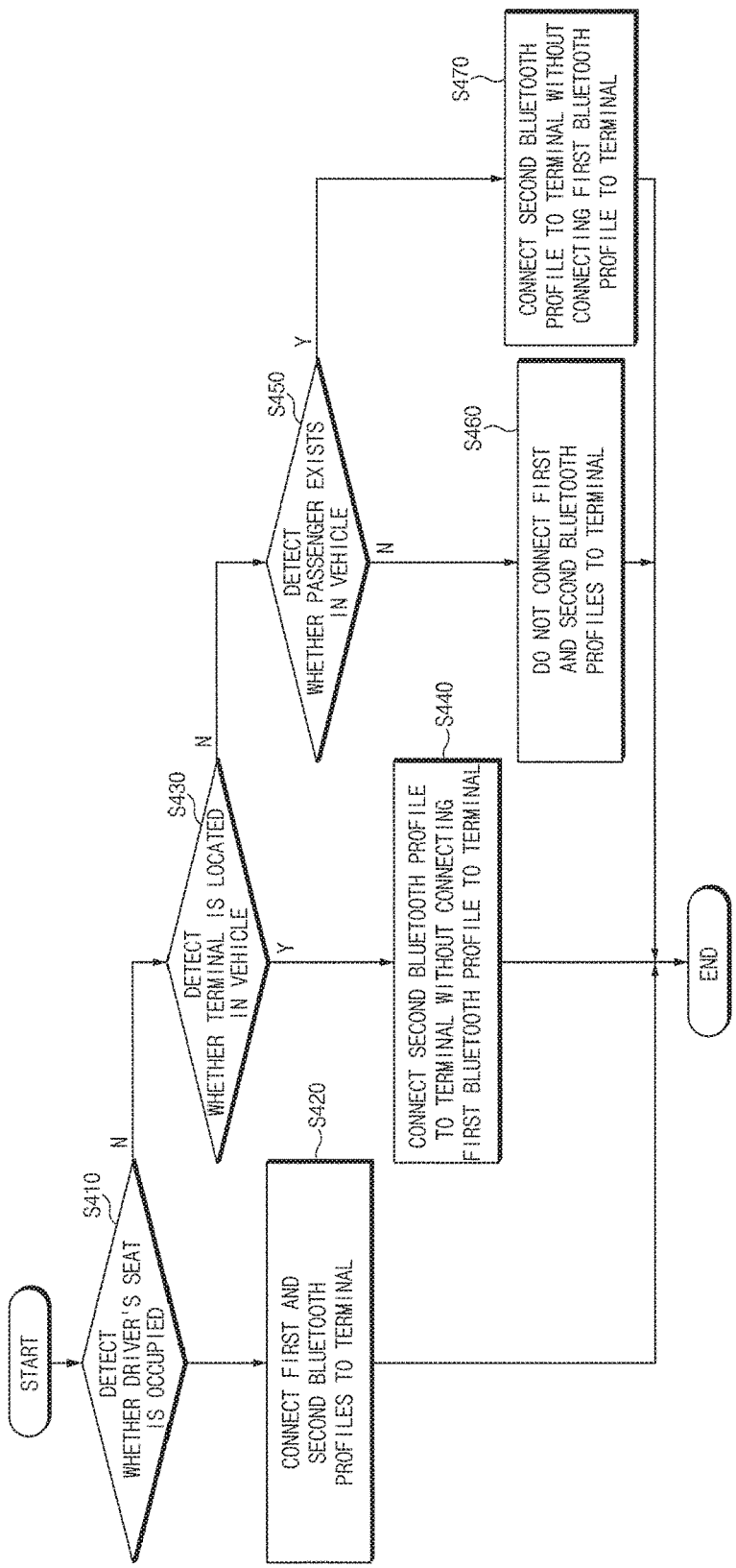
FIG. 6 is a flowchart illustrating a method for managing a communication connection of a vehicle according to an exemplary embodiment of the present disclosure.

FIG. 6 is a flowchart illustrating a method for managing a communication connection of a vehicle according to an exemplary embodiment of the present disclosure.

Referring to FIG. 6, the communication connection management method of the vehicle according to the exemplary embodiment of the present disclosure may include detecting whether the driver's seat is occupied (S410), connecting the first Bluetooth profile and the second Bluetooth profile to the terminal in the case that the driver's seat is occupied (S420), detecting whether the terminal is located in the vehicle in the case that the driver's seat is not occupied (S430), connecting the second Bluetooth profile to the terminal without connecting the first Bluetooth profile to the terminal in the case that the terminal is located in the vehicle (S440), detecting whether the passenger exists in the vehicle in the case that the terminal is not located in the vehicle (S450), not connecting the first Bluetooth profile and the second Bluetooth profile to the terminal in the case that the passenger does not exist in the vehicle (S460), and connecting the second Bluetooth profile to the terminal without connecting the first Bluetooth profile to the terminal in the case that the passenger exists in the vehicle (S470). For instance, the first Bluetooth profile may be the HFP, and the second Bluetooth profile may be the $A^2DP$ or AVRCP.

The above-described operations S410 to S440 may be substantially the same as operations S110 to S140 described with reference to FIG. 2, and thus hereinafter, operations S450 to S470 will be described in detail.

As a result of the determination in operation S430, in the case that the terminal is not located in the vehicle, operation S450 may be carried out.

In operation S450, the passenger detection sensor 230 may detect whether the passenger exists in the vehicle. As a result of the determination in operation S450, in the case that the passenger does not exist in the vehicle, operation S460 may be carried out, and in the case that the passenger exists in the vehicle, operation S470 may be carried out.

In operation S460, the Bluetooth connection management controller 240 may not connect the HFP and the $A^2DP$/AVRCP to the terminal in the case that the driver's seat is not occupied, the terminal of the user is not located in the vehicle, and the passenger does not exist in the vehicle.

In operation S470, the Bluetooth connection management controller 240 may not connect the HFP to the terminal and may connect the $A^2DP$/AVRCP to the terminal in the case that the driver's seat is not occupied, the terminal of the user is not located in the vehicle, and the passenger exists in the vehicle.

In this case, since it is very likely that the user is located outside the vehicle, the user may be allowed to make the call by directly using the terminal. In addition, although the user is not seated on the driver's seat and the terminal is not located in the vehicle, the passenger in the vehicle may enjoy media contents (e.g., music) reproduced by the terminal in the vehicle (e.g., through a speaker of the vehicle).

While the present invention has been described with reference to exemplary embodiments, it will be apparent to those skilled in the art that various changes and modifications may be made without departing from the spirit and scope of the present invention.

Therefore, exemplary embodiments of the present invention are not limiting, but illustrative, and the spirit and scope of the present invention is not limited thereto. The spirit and scope of the present invention should be interpreted by the following claims, and it should be interpreted that all technical ideas which are equivalent to the present invention are included in the spirit and scope of the present invention.

What is claimed is:

1. A Bluetooth apparatus for a vehicle, which is configured to control a connection between a plurality of Bluetooth profiles, which includes a first Bluetooth profile and a second Bluetooth profile, and a terminal of a user based on whether a driver's seat is occupied by the user or based on whether the driver's seat is occupied by the user and whether the terminal of the user is located in the vehicle, wherein, when the driver's seat is not occupied, the first Bluetooth profile or the second Bluetooth profile is connected to the terminal based on whether the terminal of the user is located in the vehicle, and when the driver's seat is not occupied and the terminal is located in the vehicle, the first Bluetooth profile is not connected to the terminal while the second Bluetooth profile is connected to the terminal.

2. The Bluetooth apparatus of claim 1, wherein the first Bluetooth profile is a hands-free profile (HFP), and the second Bluetooth profile is an advanced audio distribution profile ($A^2DP$) or an audio/video remote control profile (AVRCP).

3. The Bluetooth apparatus of claim 2, wherein the first Bluetooth profile and the second Bluetooth profile are connected to the terminal when the driver's seat is occupied.

4. The Bluetooth apparatus of claim 2, wherein, when the driver's seat is not occupied and the terminal is not located in the vehicle, the first Bluetooth profile and the second Bluetooth profile are not connected to the terminal.

5. The Bluetooth apparatus of claim 1, wherein, when the driver's seat is not occupied, the terminal is not located in the vehicle, and a passenger exists in the vehicle, the first Bluetooth profile is not connected to the terminal and the second Bluetooth profile is connected to the terminal.

6. An apparatus for managing a communication connection of a vehicle, comprising:

a driver seat detection sensor configured to detect whether a driver's seat is occupied;

a terminal detection sensor configured to detect whether a terminal of a user is located in the vehicle; and a Bluetooth connection management controller configured to control a connection between a plurality of Bluetooth profiles, which include a first Bluetooth profile and a second Bluetooth profile, and the terminal based on whether the driver's seat is occupied by the user or based on whether the driver's seat is occupied by the user and whether the terminal of the user is located in the vehicle, wherein, when the driver's seat is not occupied, the first Bluetooth profile or the second Bluetooth profile is connected to the terminal based on whether the terminal of the user is located in the vehicle, and when the driver's seat is not occupied and the terminal is located in the vehicle, the Bluetooth connection management controller connects the second Bluetooth profile to the terminal without connecting the first Bluetooth profile to the terminal.

7. The apparatus of claim 6, wherein the first Bluetooth profile is an HFP, and the second Bluetooth profile is an $A^2DP$ or an AVRCP.

8. The apparatus of claim 7, wherein, when the driver's seat is occupied, the Bluetooth connection management controller connects the first Bluetooth profile and the second Bluetooth profile to the terminal.

9. The apparatus of claim 7, wherein, when the driver's seat is not occupied and the terminal is not located in the vehicle, the Bluetooth connection management controller disconnect the first Bluetooth profile and the second Bluetooth profile to the terminal.

10. The apparatus of claim 6, wherein the driver seat detection sensor comprises a driver seat occupancy sensor or a seat-belt sensor.

11. The apparatus of claim 6, wherein the terminal detection sensor is configured to determine that the terminal is located in the vehicle when the terminal detection sensor periodically transmits an ultrasonic wave to the terminal and receives a response message from the terminal.

12. The apparatus of claim 6, wherein, when the driver's seat is not occupied, the terminal is not located in the vehicle, and a passenger exists in the vehicle, the first Bluetooth profile is not connected to the terminal and the second Bluetooth profile is connected to the terminal.

13. A method for managing a communication connection of a vehicle, comprising steps of:
   detecting, by a driver seat detection sensor, whether a driver's seat is occupied;
   detecting, by a terminal detection sensor, whether a terminal of a user is located in the vehicle; and
   controlling, by a Bluetooth connection management controller, a connection between a plurality of Bluetooth profiles, which include a first Bluetooth profile and a second Bluetooth profile, and the terminal based on whether the driver's seat is occupied by the user or based on whether the driver's seat is occupied by the user and whether the terminal of the user is located in the vehicle,
   wherein the step of controlling comprises, when the driver's seat is not occupied, connecting the first Bluetooth profile or the second Bluetooth profile to the terminal based on whether the terminal of the user is located in the vehicle,
   wherein when the driver's seat is not occupied and the terminal is located in the vehicle, connecting the second Bluetooth profile to the terminal without connecting the first Bluetooth profile to the terminal.

14. The method of claim 13, wherein the first Bluetooth profile is an HFP, and the second Bluetooth profile is an $A^2DP$ or an AVRCP.

15. The method of claim 14, wherein the step of controlling comprises connecting the first Bluetooth profile and the second Bluetooth profile to the terminal in the case that the driver's seat is occupied.

16. The method of claim 15, wherein the step of controlling comprises disconnecting the first Bluetooth profile and the second Bluetooth profile to the terminal in the case that the driver's seat is not occupied and the terminal is not located in the vehicle.

17. The method of claim 13, wherein the step of controlling comprises when the driver's seat is not occupied, the terminal is not located in the vehicle, and a passenger exists in the vehicle, connecting the second Bluetooth profile to the terminal without connecting the first Bluetooth profile to the terminal.

* * * * *